US006319486B1

(12) United States Patent
Mou et al.

(10) Patent No.: US 6,319,486 B1
(45) Date of Patent: Nov. 20, 2001

(54) CONTROL OF MORPHOLOGY OF MESOPOROUS ALUMINOSILICATE OR PURE-SILICA MOLECULAR SIEVES BY EFFECT OF ALCOHOL

(75) Inventors: Chung-Yuan Mou; Hong-Ping Lin, both of Taipei (TW)

(73) Assignee: Chinese Petroleum Corp., Taipei (TW)

( * ) Notice: Subject to any disclaimer, the term of this patent is extended or adjusted under 35 U.S.C. 154(b) by 0 days.

(21) Appl. No.: 09/400,930

(22) Filed: Sep. 22, 1999

(51) Int. Cl.$^7$ .............................. C01B 37/00; C01B 37/02
(52) U.S. Cl. ...................... 423/702; 423/705; 423/716; 423/327.1; 423/328.2; 423/335
(58) Field of Search ................... 423/702, 705, 423/716, 327.1, 328.2, 335

(56) References Cited

U.S. PATENT DOCUMENTS

| 5,112,589 | * | 5/1992 | Johnson et al. . | |
| 5,876,690 | * | 3/1999 | Mou et al. | 423/702 |
| 5,922,299 | * | 7/1999 | Bruinsma et al. | 423/335 |
| 6,174,512 | * | 1/2001 | Kosuge et al. | 423/705 |

FOREIGN PATENT DOCUMENTS 10-328558 * 12/1998 (JP) .

OTHER PUBLICATIONS

Yang et al., "Synthesis of Mesoporous Silica Species under Quiescent Aqueous Acidic Conditions," J. Mater. Chem., 8(3), pp. 743–750, Mar. 1998.*
Grun et al., "The Synthesis of Micrometer–and Submicrometer–Size Spheres of Ordered Mesoporous Oxide MCM–41," Advanced Materials, 9(3), pp. 254–257, 1997.*
Schacht et al., "Oil–Water Interface Templating of Mesoporous Macroscale Structures," Science, vol. 273, pp. 768–771, Aug. 1996.*
Lewis, Hawley's Condensed Chemical Dictionary, Twelfth Edition, p. 1035, 1993.*

* cited by examiner

Primary Examiner—David R. Sample
(74) Attorney, Agent, or Firm—Knobbe, Martens, Olson & Bear, LLP

(57) ABSTRACT

The present invention relates to a method for synthesizing mesoporous aluminosilicate or pure-silica molecular sieves with newly hierarchical morphologies by adding suitable amount of alcohol. There are hollow sphere, hollow sphere with a pillar in it and solid sphere by adjusting the $Al_2O_3$/$SiO_2$ and tetraethylorthosilicate/$SiO_2$ ratio. The wall of the micron-sized spherical structure consisted of well-ordered cylindrical pores of nanometer size. The dimensions and the morphologies of the mesoporous structure are adjustable by varying the reaction components as the water content, the silicon/surfactant ratio and the reaction and the hydrothermal temperature.

18 Claims, 3 Drawing Sheets

CONTROL OF MORPHOLOGY OF MESOPOROUS ALUMINOSILICATE OR PURE-SILICA MOLECULAR SIEVES BY EFFECT OF ALCOHOL

FIELD OF THE INVENTION

The present invention relates generally to a mesoporous aluminosilicate or pure-silica molecular sieves, and in particular relates to a mesoporous aluminosilicate or pure-silica molecular sieves composed of hollow balls or hollow balls with pillars in them or solid spheres.

BACKGROUND OF THE INVENTION

Recently, the discovery of the new family of crystalline mesoporous materials M41S by researchers at Mobil Corp. (U.S. Pat. No. 5,108,725) has attracted great attention. These mesoporous molecular sieves with adjustable and uniformed pore sizes in the range of 1.5 to 10.0 nm can be applied in various fields. MCM-41, one member of this series, possessing a hexagonal arrangement of uniformly sized channel mesopores, has been the focus of the most recent applications in catalysts and absorbents for larger molecules.

Since the MCM-41 materials were synthesized from a complex mixture of surfactants and silicate, the behavior and the structure of the system might be variable. However, the previous literature reported that the morphology of MCM-41 material was limited in microparticles. This is caused by two reasons. One is that the MCM-41 structure was always prepared from acidifying highly condensed silicate form; it is too rigid to bend into other large-scaled morphologies. Second, there is no suitable micron-sized template existed in the synthetic composition to prepare the hierarchical structure. Therefore, there is an opportunity to tailor the morphology of MCM-41 products to a designed structure by using a soft or less condensed silicon source and a proper composition promoting the formation of micron-sized template.

Based on the theory of surfactant complex fluids, the morphology of aggregates formed by self-assembly of surfactants in solution and the evolution of morphology with additives, such as alcohol with medium chain length, is of current interest. Thus, we added a proper amount of alcohol into surfactant-silicate synthetic system to produce the mesoporous materials with special micron-sized morphologies.

SUMMARY OF THE INVENTION

The present invention provides a method for making mesoporous molecular sieves by adding the desired amount of alcohol.

Another object of the present invention is to provide a pure-silica molecular sieve having a hollow spherical morphology with a pillar inside and a method forming the same.

A further object of the present invention is to provide an aluminosilicate molecular sieve having a hollow spherical morphology and a method forming the same.

A still further object of the present invention is to provide a pure-silica molecular sieve having a solid spherical morphology and a method forming the same.

(1) Synthesis of a Pure-silica Molecular Sieve Having a Hollow Spherical Morphology with a Pillar Inside.

The alcohol was added to a clear aqueous solution of the surfactant silicate under stirring and a gel mixture was formed. After stirring for about 10–30 minutes at room temperature, a proper amount of sulfuric acid or other acids was gradually added into the gel mixture. The pH value of the final mixture was adjusted to about 11.5–9.0. The molar ratio of the resultant gel composition was about within 1 surfactant:(3.0–0.3) $SiO_2$:(2.78–0.40)NaOH:(2.50–0.3) HA: (3.0–0.1) alcohol:(50–2000) $H_2O$. Then, the mixture is loaded into an autoclave and statically heated at about (20–25° C.) for about 1–480 hours. The resulting solid products were recovered by filtration, washed with deionized water and dried in air at room temperature or 100° C. To remove the organic species in the pores of mesoporous silicate, the as-synthesized sample were calcined in air at 500–900° C. for about 6–12 hours.

(2) Synthesis of an aluminosilicate molecular sieve having a hollow spherical morphology.

The aluminosilicate was synthesized with the same process mentioned in (1) except that a suitable amount of sodium aluminate aqueous solution was added into the aqueous solution of surfactant-silicate. The silicate/aluminate molar ratio. is about 60–10.

(3) Synthesis of a pure-silica molecular sieve having a solid spherical morphology.

The silicate was synthesized with the same process mentioned in (1) except that a suitable amount of tetraethylorthosilicate (TEOS) was added into the aqueous solution of surfactant-silicate. The molar ratio of TEOS/surfactant is about 10–0.5.

Figure 1:
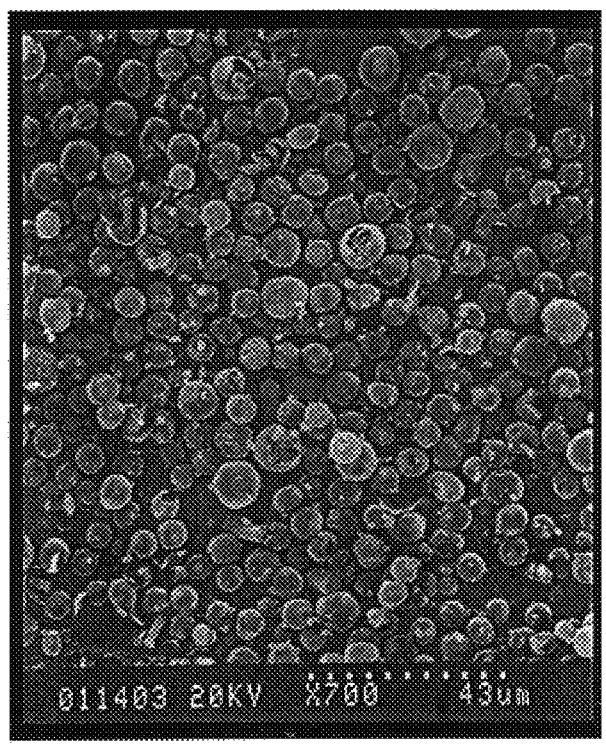
FIG. 1 shows the SEM micrograph of the calcined silica material prepared from $C_{14}$TMAB-silicate system in accordance with a first preferred embodiment of the present invention.

DETAILED DESCRIPTION OF THE PREFERRED EMBODIMENT (A-1) Synthesis of a pure-silica molecular sieve having a hollow spherical morphology with a pillar inside.

To prepare the pure-silica mesoporous molecular sieve having a hollow spherical morphology with a pillar inside the alcohol was added to a clear aqueous solution of the surfactant-silicate under stirring and a gel mixture was formed. After stirring for about 10–30 minutes at room temperature, a proper amount of sulfuric acid or other acids was gradually added into the gel mixture. This step takes about 10–60 minutes. The pH value of the final mixture was adjusted to about 11.5–9.0. The molar ratio of the resultant gel composition was about within 1 surfactant:(3.0–0.3) $SiO_2$:(2.78–0.40)NaOH:(2.50–0.3) HA:(3.0–0.1) alcohol: (50–2000) $H_2O$. The source of the silicon is sodium silicate. The surfactants for use in the reaction system are quaternary ammonium $R_1R_2R_3R_4N^+X^-$, where one of $R_1$, $R_2$, $R_3$, and $R_4$ is alkyl chain with 6–20 carbon atoms, the remainders are the alkyl chains with 1 to 6 carbon atoms and $X^-$ is the counterion ($Cl^-$, $Br^-$, $NO_3^-$, $OH^-$ etc.). HA represents the acid. The alcohol is selected from alkyl or aromatic alcohols. Then, the mixture is loaded into an autoclave. Subsequently, the mixture is statically heated at about 20–250° C. for about 1–480 hours. The resulting solid products are recovered by filtration, washed with deionized water and dried in air at room temperature or 100° C. To remove the organic species in the pores of mesoporous silicate, the as-synthesized sample is calcined in air at 500–900° C. for about 6–12 hours (heated from room temperature to the desired temperature with a heating rate of 1.5° C./min).

(A-2) Synthesis of an aluminosilicate molecular sieve having a hollow spherical morphology.

The aluminosilicate molecular sieve having a hollow spherical morphology. was synthesized with the same process mentioned above in (A-1) except that a suitable amount of sodium aluminate aqueous solution was added into the solution of surfactant-silicate. The Silicate/aluminate molar ratio is about 60–10.

(A-3) Synthesis of a pure-silica molecular sieve having a solid spherical morphology.

The pure-silica molecular sieve having a solid spherical morphology is synthesized with the same process mentioned above in (A-1) except that a suitable amount of tetraethylorthosilicate (TEOS) is added into the aqueous solution of surfactant-silicate. The molar ratio of TEOS/surfactant is about 10–0.5.

(B) Characterization of the Pure-Silica/Aluminosilicate products

Scanning electron microscopy (SEM) is performed on a Hitachi S-800 or S-2400 using an accelerating voltage of 20 keV. Powder x-ray diffraction (XRD) data is collected on a Scintag X1 diffractometer using Cu Kα radiation (α=0.154 nm). The transmission electron micrographs (TEM) are taken on a Hitachi H-7100 operated at 100 keV. The $N_2$ adsorption-desorption isotherms are obtained at 77K on a Micrometric ASAP 2000 apparatus, which gets a Brunaer-Emmett-Teller (BET) surface area. The sample is outgassed at 300° C. for about 6–12 hours in $10^{-3}$ torr prior to adsorption. The data is analyzed by the BJH (Barrett-Joyner-Halenda) method with the Halsey equation for multilayer thickness.

EXAMPLE 1

To prepare the pure-silica material of hollow ball morphology with a pillar inside, 140g of a 12% $C_{14}$TMAB (tetradecyltrimethylammonium bromide, 99%; Merck) aqueous solution was mixed with 11.0 g sodium silicate (27% $SiO_2$ and 14% NaOH; Aldrich). After the resulting mixture was stirred for about 10 minutes at room temperature, 21.0 g of 1.20M $H_2SO_4$ solution was added by pipette very slowly (total time about 30 minutes). The gel mixture formed after this acidification was allowed to stand for about 20 minutes and then was heated at 100° C. for about 48 hours in an autoclave. The solid product recovered by filtration was washed with deionized water, dried at ambient conditions, and calcined at about 540° C. in air for about 12 hours to remove the template.

FIG. 1 shows the SEM micrograph of the calcined silica material prepared from $C_{14}$TMAB-silicate system. The morphology of this silica sample is almost completely in hollow-ball structure without micron particle. There are some broken balls in the sample, these reveal that the micron-sized ball is hollow and has a pillar in it. The diameter of these balls is uniformed and about 5.0 $\mu$m. The gel composition in term of molar ratio is listed as follows:

| Compound | quantity(moles) |
|---|---|
| $C_{14}$TMAB | 1.0 |
| $SiO_2$ | 1.50 |
| NaOH | 1.20 |
| $H_2SO_4$ | 0.48 |
| BuOH | 1.44 |
| $H_2O$ | 230.0 |

Figure 2:
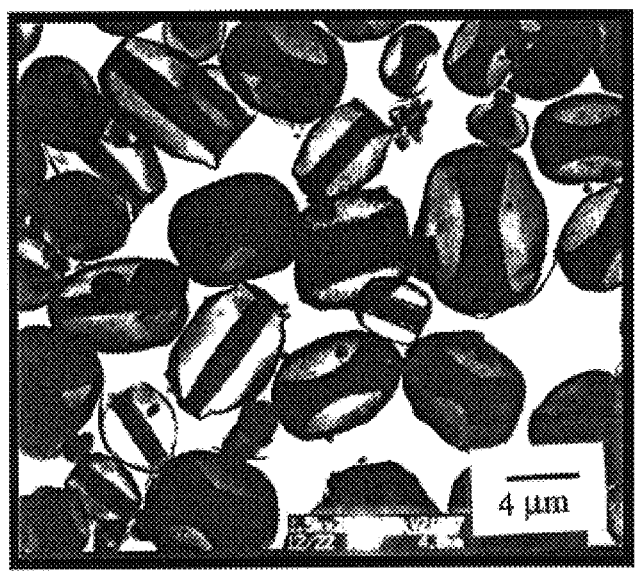
FIG. 2 shows the SEM micrograph of the calcined silica material prepared from $C_{14}$TMAB-silicate system in accordance with a first preferred embodiment of the present invention under 150° C. hydrothermal reaction condition for 2 days.

FIG. 2 shows the transmission electron microscopy (TEM) image of the sample synthesized from the same composition as above, then under 150° C. hydrothermal reaction condition for 2 days. It apparently reveals that every hollow ball has a pillar in it and the pillar has different types.

EXAMPLE 2

Figure 3:
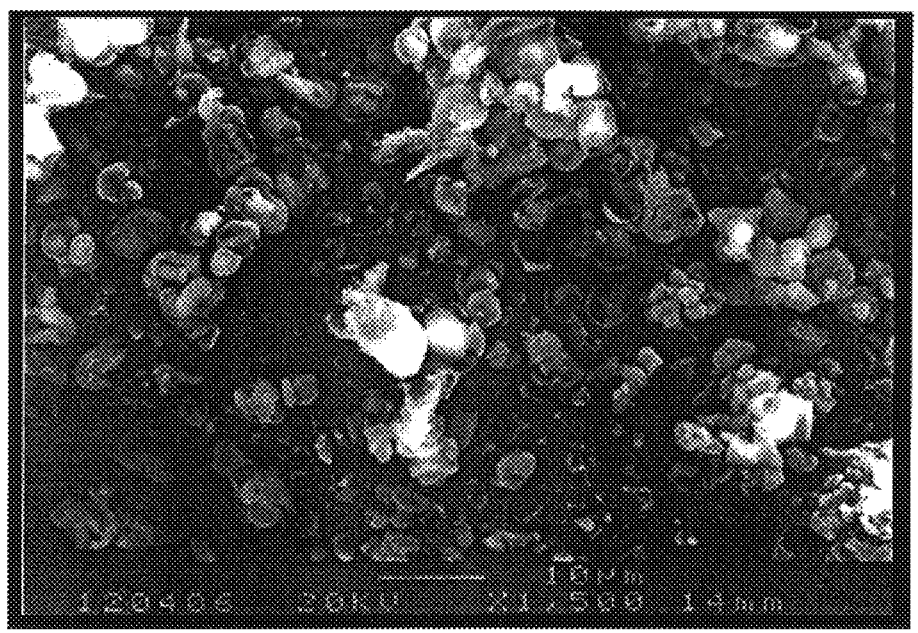
FIG. 3 shows the SEM micrograph of the calcined silica material prepared from $C_{12}$TMAB-silicate system in accordance with a second preferred embodiment of the present invention.

FIG. 3 displays the SEM photograph of the calcined silica sample synthesized from the dodecyltrimethylammonium chloride ($C_{12}$TMAB)-silicate system. Based on the SEM micrographs, the percentage of the particles in hollow ball form is more than 60% for this sample, the rest are in broken ball morphology. The diameter of these balls is about 3.0 $\mu$m. The gel composition in term of molar ratio is listed as follows:

| Compound | quantity(moles) |
|---|---|
| $C_{12}$TMAB | 1.0 |
| $SiO_2$ | 1.50 |
| NaOH | 1.20 |
| $H_2SO_4$ | 0.48 |
| PeOH | 0.91 |
| $H_2O$ | 338 |

EXAMPLE 3

Figure 4A:
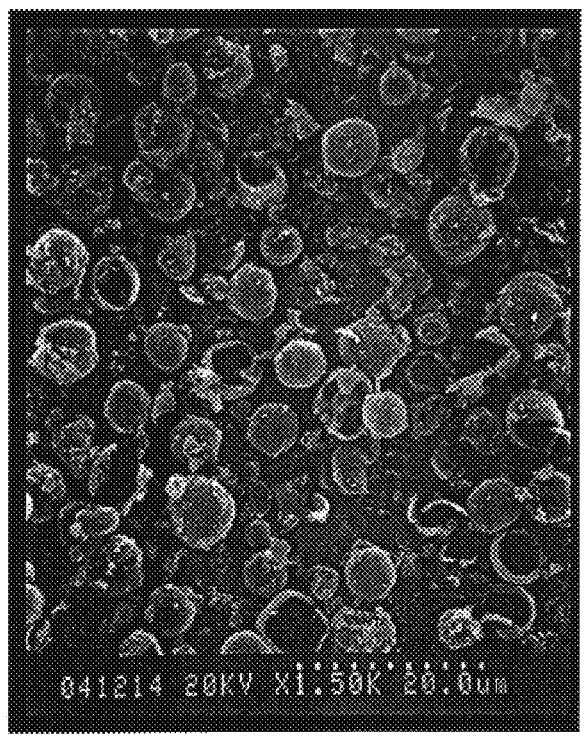
FIG. 4A shows the SEM micrograph of the calcined aluminosilicate material prepared from $C_{14}$TMAB-aluminosilicate system in accordance with a third preferred embodiment of the present invention.
Figure 4B:
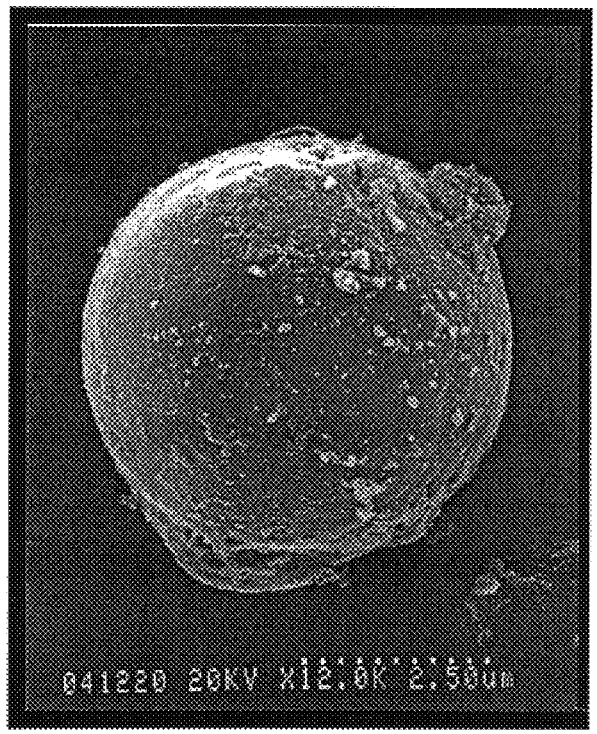
FIG. 4B shows the SEM micrograph of the calcined aluminosilicate material prepared from $C_{14}$TMAB-aluminosilicate system in accordance with a third preferred embodiment of the present invention in a larger magnification.

FIG. 4A displays the SEM photograph of the calcined silica sample synthesized from the tetradecyltrimethylammonium bromide ($C_{14}$TMAB)-aluminosilicate system by adding the desired amount of sodium aluminate into the mother solution during the hydrothermal reaction. The morphology is almost totally in uniform hollow spheres of the diameter about 5 $\mu$m. Some broken spheres show that micron-sized sphere is really hollow and does not have a pillar in it. Referring to FIG. 4B, there exist two tiny holes respectively at the two polar parts of the hollow spheres in a larger magnification. This kind of special morphology could be used as a drug release in the medical or biochemistry field. The gel composition in term of molar ratio is listed as follows

| Compound | quantity(moles) |
|---|---|
| $C_{14}TMAB$ | 1.0 |
| $SiO_2$ | 1.40 |
| Sodium aluminate | 0.10 |
| NaOH | 1.10 |
| $H_2SO_4$ | 0.45 |
| BuOH | 1.60 |
| $H_2O$ | 250.0 |

EXAMPLE 4

Figure 5:
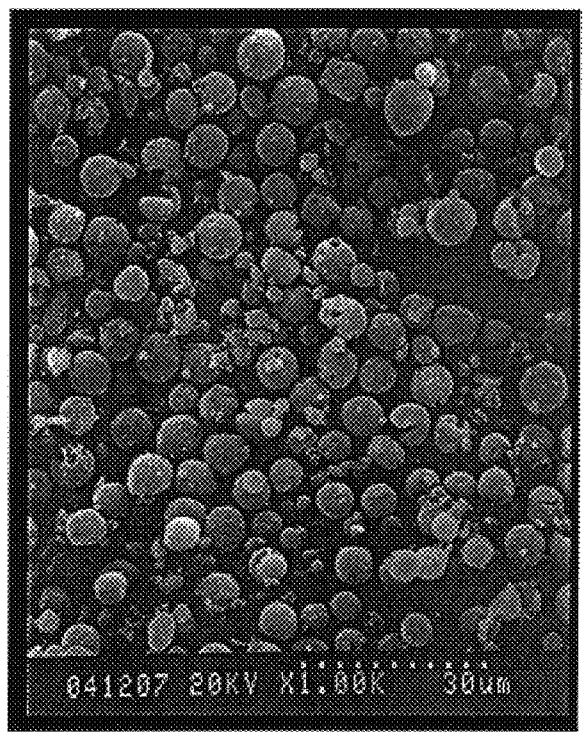
FIG. 5 shows the SEM micrograph of the calcined silica material prepared from $C_{14}$TMAB-silicate system in accordance with a fourth preferred embodiment of the present invention.

FIG. 5 shows the SEM photograph of the calcined sample obtained from the $C_{14}$TMAB-aluminosilicate system by adding the desired amount of TEOS into the mother solution during the hydrothermal reaction. The morphology is almost totally in uniform spheres of the diameter about 5 μm. The spheres are actually solid and have more mechanical stability. The spheres entirely preserve after press them. The gel composition in term of molar ratio is listed as follows:

| Compound | quantity(moles) |
|---|---|
| $C_{14}TMAB$ | 1.0 |
| $SiO_2$ | 1.40 |
| TEOS | 1.2 |
| NaOH | 1.10 |
| $H_2SO_4$ | 0.45 |
| BuOH | 1.60 |
| $H_2O$ | 250.0 |

The table below is the physical properties of the mesoporous materials of the examples 1–4.

| Example | XRD d100 d-spacing/nm | BET surface area/ $m^2/g$ | Pore size/ nm | Wall thickness/ nm |
|---|---|---|---|---|
| 1 | 3.79 | 1016 | 2.40 | 1.97 |
| 2 | 3.40 | 1008 | 1.98 | 1.94 |
| 3 | 3.70 | 1050 | 2.32 | 1.95 |
| 4 | 3.81 | 982 | 2.42 | 1.98 |

From the above description, there are many advantages and characteristics of the invention. The results revealed that uniformed-sized and special micron-sized morphologies, hollow balls or solid spheres, could be easily prepared and tailored by changing the added amount of alcohol and the $SiO_2$/surfactant ratio. The dimension and shapes of the products are greatly sensitive to various controllable factors, such as surfactant concentration, water content, the carbon chain length of the surfactant, counterions, the addition of salts, the temperature, and the silicon/aluminum ratio or the TEOS/surfactant ratio. This provided an advantageous technique that we could easily modify the size of the hollow ball or solid sphere in the range of 1–10 μm.

In particularly, the addition of the alcohol could promote the surfactants-silicate to form a membrane-type structure initially with less condensation at high alkalinity. Then, the soft intermediate structure can be bent into the spherical hierarchical structure with gradual silica condensation, which is dependent on the added amount of alcohol and $SiO_2$/surfactant ratio. The formation of this highly ordered structure is a biomimetic process and the hierarchical structure is alike to that of frustles of marine radiolaria. Our results could provide not only a path for understanding the biomineralization process in nature but also a model for preparing the designed structures.

In addition to the basic application in the catalysts, supporters and sorbents, the hierarchical materials also have technological as well as fundamental usage. The hollow balls could be used as controllable drug-delivery system, in separation technology and templates for producing micron-sized conducting wires and opticoelectronics. And the solid silicate molecular sieves can be applied as column packing materials. The uniform-sized characteristic of micron-sized morphologies in this invention is really needed for optical crystals. It could improve the analytical resolution greatly.

While the invention has been described in terms of a single preferred embodiment, various alternatives and modifications can be devised by those skilled in the art without departing from the invention. Accordingly, the present invention is intended to embrace all such alternatives which fall within the scope of the appended claims.

The embodiments of the invention in which an exclusive property or privilege is claimed are deed as follows:

1. A pure-silica molecular sieve in a calcined form comprising:
    a microparticle comprising a hollow spherical morphology with a pillar inside the hollow sphere;
    a microstructure having a hexagonal arrangement of uniformly-sized pores of a diameter determined by a carbon number of a longest chain of a surfactant used to synthesize the molecular sieve; and
    a hexagonal electron diffraction pattern that can be indexed with a $d_{100}$ value determined by the carbon number of a longest chain of a surfactant used to synthesize the molecular sieve.

2. The pure-silica molecular sieve of claim 1, wherein the molecular sieve has a Brunaer-Emmett-Teller surface area of about 1000 $m^2/g$.

3. The pure-silica molecular sieve of claim 1, wherein a wall thickness of the molecular sieve is about 1.9 nm.

4. A method for preparing a molecular sieve having a hollow spherical morphology with a pillar inside comprising:
    a) preparing an aqueous mixture having a molar ratio composition of (a) $R_1R_2R_3R_4Q^+X^-$:(b) $SiO_2$:(c) $M(OH)_n$:(d) alcohol:(e) $H_2O$, wherein a=1, $0.3 \leq b \leq 3.0$, $0.24 \leq c \leq 2.78$, $0.1 \leq d \leq 3.0$ and $50 \leq e \leq 2000$,
        wherein at least one of $R_1$, $R_2$, $R_3$ and $R_4$ is an alkyl chain with 6 to 20 carbon atoms and the remainder of $R_1$, $R_2$, $R_3$ and $R_4$ are alkyl chains with 1 to 6 carbon atoms,
        wherein Q is selected from the group consisting of nitrogen atom and phosphorous atom,
        wherein $X^-$ is a counterion,
        wherein M is an alkali metal when n=1,
        wherein M is an alkaline earth metal when n=2;
    b) stirring the aqueous mixture at a temperature of about 0° C. to about room temperature for about 10 to about 30 minutes to form a gel mixture;
    c) slowly adding an acid to the gel mixture in an amount determined by $H^+$/surfactant molar ratio=0.2 to 2 within a period of about 10 to about 60 minutes, the stirring being maintained in the period and a final pH value of about 10 being reached;
    d) heating the resulting mixture of step c) at a temperature of about 20 to about 250° C. for about 1 to about 480 hours to form the molecular sieve;

e) recovering the molecular sieve by filtration and washing the molecular sieve with deionized water; and f) calcining the molecular sieve to remove the $R^1R_2R_3R_4Q^+$ in the pores of the molecular sieve at a temperature of about 500 to about 900° C. for about 6 to about 12 hours with a heating rate of about 0.5 to about 2° C./min.

5. The method of claim 4, wherein the alcohol comprises an alkyl alcohol.

6. The method of claim 5, wherein the alkyl alcohol is butanol or pentanol.

7. The method of claim 4, wherein the alcohol comprises an aromatic alcohol.

8. The method of claim 4, wherein $X^-$ is selected from the group consisting of $Cl^-$, $Br^-$, $NO_3^-$, and $OH^-$.

9. A method for preparing a molecular sieve of hollow spherical morphology comprising:

a) preparing an aqueous mixture having a molar ratio composition of (a) $R_1R_2R_3R_4Q^{30}\ X^-$:(b) $SiO_2$:(c) $Al_2O_3$:(d) $M(OH)_n$:(e) alcohol:(f) $H_2O$, wherein a=1, $0.3 \leq b \leq 3.0$, $0 < c \leq 0.3$, $0.24 \leq d \leq 2.78$, $0.1 \leq e \leq 3.0$ and $50 \leq f \leq 2000$, wherein at least one of $R_1$, $R_2$, $R_3$ and $R_4$ is an alkyl chain with 6 to 20 carbon atoms and the remainder of $R_1$, $R_2$, $R_3$ and $R_4$ are alkyl chains with 1 to 6 carbon atoms, wherein Q is selected from the group consisting of nitrogen atom and phosphorous atom, wherein $X^-$ is a counterion, wherein M is an alkali metal when n=1, wherein M is an alkaline earth metal for n=2;

b) stirring the aqueous mixture at a temperature of about 0° C. to about room temperature for about 10 to about 30 minutes to form a gel mixture;

c) slowly adding an acid to the gel mixture in an amount determined by $H^+$/surfactant molar ratio=0.2 to 2 within a period of about 10 to about 60 minutes, the stirring being maintained in the period and a final pH value of about 10 being reached;

d) heating the resulting mixture of step c) at a temperature of about 20 to about 250° C. for about 1 to about 480 hours to form the molecular sieve;

e) recovering the molecular sieve by filtration and washing the molecular sieve with deionized water; and f) calcining the molecular sieve to remove the $R_1R_2R_3R_4Q^+$ in the pores of the molecular sieve at a temperature of about 500 to about 900° C. for about 6 to about 12 hours with a heating rate of about 0.5 to about 2° C./min.

10. The method of claim 9, wherein the alcohol comprises an alkyl alcohol.

11. The method of claim 10, wherein the alkyl alcohol is butanol or pentanol.

12. The method of claim 9, wherein the alcohol comprises an aromatic alcohol.

13. The method of claim 9, wherein the $X^-$ is selected from the group consisting of $Cl^-$, $Br^-$, $NO_3^-$, and $OH^-$.

14. A method for preparing a molecular sieve of solid spherical morphology comprising:

a) preparing an aqueous mixture having a molar ratio composition of (a) $R_1R_2R_3R_4Q^+X^-$:(b) $SiO_2$:(c) tetraethylorthosilicate:(d) $M(OH)_n$:(e) alcohol:(f) $H_2O$, wherein a=1, $0.3 \leq b \leq 3.0$, $0 < c \leq 10$, $0.24 \leq d \leq 2.78$, $0.1 \leq e \leq 3.0$ and $50 \leq f \leq 2000$, wherein at least one of $R_1$, $R_2$, $R_3$ and $R_4$ is an alkyl chain with 6 to 20 carbon atoms and the remainder of $R_1$, $R_2$, $R_3$ and $R_4$ are alkyl chains with 1 to 6 carbon atoms, wherein Q is selected from the group consisting of nitrogen atom and phosphorous atom, wherein $X^-$ is a counterion, wherein M is an alkali metal for n=1, wherein M is an alkaline earth metal for n=2;

b) stirring the aqueous mixture at a temperature of about 0° C. to about room temperature for about 10 to about 30 minutes to form a gel mixture;

c) slowly adding an acid to the gel mixture in an amount determined by $H^+$/surfactant molar ratio=0.2 to 2 within a period of about 10 to about 60 minutes, the stirring being maintained in the period and a final pH value of about 10 being reached;

d) heating the resulting mixture of step c) at a temperature of about 20 to about 250° C. for about 1 to about 480 hours to form the molecular sieve;

e) recovering the molecular sieve by filtration and washing the molecular sieve with deionized water; and f) calcining the molecular sieve to remove the $R_1R_2R_3R_4Q^+$ in the pores of the molecular sieve at a temperature of about 500 to about 900° C. for about 6 to about 12 hours with a heating rate of about 0.5 to about 2° C./min.

15. The method of claim 14, wherein the alcohol comprises an alkyl alcohol.

16. The method of claim 15, wherein the alkyl alcohol is butanol or pentanol.

17. The method of claim 14, wherein the alcohol comprises an aromatic alcohol.

18. The method of claim 14, wherein the $X^-$ is selected from the group consisting of $Cl^-$, $Br^-$, $NO_3^-$, and $OH^-$.

* * * * *